July 14, 1959  F. R. PRESCOTT  2,894,294

PORE CLOSURE STRUCTURE FOR MULTIPLE GLAZED UNIT

Filed April 8, 1955

INVENTOR.
FRANK R. PRESCOTT
BY
Oscar L. Spencer
ATTORNEY though it may be located in sheet 11, if desired. A sleeve-like element generally indicated by the numeral 16 is positioned in the opening 15. This element is in the form of an inverted frustum. The outer surface 17 thereof is tapered at substantially the same angle as the walls of the opening 15.

United States Patent Office

2,894,294
Patented July 14, 1959

2,894,294

PORE CLOSURE STRUCTURE FOR MULTIPLE GLAZED UNIT

Frank R. Prescott, New Kensington, Pa., assignor to Pittsburgh Plate Glass Company, Allegheny County, Pa., a corporation of Pennsylvania Application April 8, 1955, Serial No. 500,059

2 Claims. (Cl. 20—56.5)

This invention relates to multiple glazed units comprising spaced sheets of glass hermetically sealed together about their edges and it has particular relation to a closure structure for a pore opening employed for the equalization of pressure between the inside and outside of the unit during its manufacture and for inserting a dry gas in the interior of the unit.

It is known that windows comprising spaced sheets of glass, the edge portions of which are appropriately sealed together to contain a dead air space, provide a good insulating glazing. One method for forming a hermetically sealed double glazed unit is set forth in U.S. Patent No. 2,624,979. This method comprises applying stripes of an electrically conductive material, such as colloidal graphite, near the edges of at least one of two sheets of glass, supporting the sheets in horizontal position one above the other, passing an electric current through the stripes to generate heat sufficient to soften the contiguous glass and allowing the edge portions of the upper sheet to drop down. The dropped edge portions are brought into contact with the edges of the lower sheet and the contacting portions of the glass are fused together to form a continuous welded glass seal. The welded units are then cooled to anneal the glass.

In forming units by this and similar methods, it is obvious that the gases between the sheets of glass become highly heated and expand. As these heated gases cool down during the annealing operation, the gases contract thus tending to set up a vacuum within the unit. In order to prevent the collapsing or shattering of the unit by the resultant differential pressure, the units are customarily formed with small openings at some convenient point through which gases can enter the units. After the units have been annealed, these holes are used to purge the interior of the units of moist air and fill them with a dry gas.

Unless the small pore holes or vents are adequately sealed, water vapor can enter the units at will and thus destroy their utility. The adequate sealing of these pore holes or vents has constituted one of the main problems in the construction of units formed by welding the edges of the glass sheets together. Practically all organic adhesive materials are characterized by permeability to moisture and may even contain moisture themselves. Therefore, where the pore holes are sealed with organic plastics alone, water vapors soon enter the unit.

In U.S. Patents Nos. 2,683,906 and 2,686,342, it has been proposed to seal a tubular metal sleeve in the pore opening by means of a low fusion point glass. The interior of the sleeve is screw-threaded or otherwise adapted to receive a screw member which closes the opening. The effectiveness of such a seal depends upon the fit of the screw in the sleeve and this fit is not always moisture-proof. A plastic sealing material is sometimes placed between the screw and the sleeve to reinforce the seal. The disadvantages of a plastic material have been pointed out above.

It has always been believed that an ideal seal for a pore opening of a multiple glazed unit is one involving the use of a glass or metal solder as the sealing means. Such materials are highly impervious to moisture. Attempts have been made to close by solder the openings of sleeves such as disclosed in the two above-mentioned patents, however, these attempts have always resulted in fracture of the metal-to-glass seal between the metal sleeve and the edges of the pore opening in the glass. The heat supplied from the solder passes quickly through the thin metal sleeve and causes cracks and checking in the fusion glass adhering the sleeve to the edges of the pore opening.

In accordance with the present invention, a sleeve-like element has been designed which can be adhered to the edges of the pore opening in the glass unit with a low fusion point sealing glass and which can be soldered closed without impairment of the glass-to-metal seal. This element is designed for use in a conically tapered pore opening and is in the shape of an inverted frustum having a cylindrical opening in its center. The opening of the element which is adjacent the base of the frustum is sealed by means of glass or metal solder.

For a better understanding of the invention, reference may now be had to the accompanying drawing in which like numerals refer to like parts throughout and in which.

Figure 1:
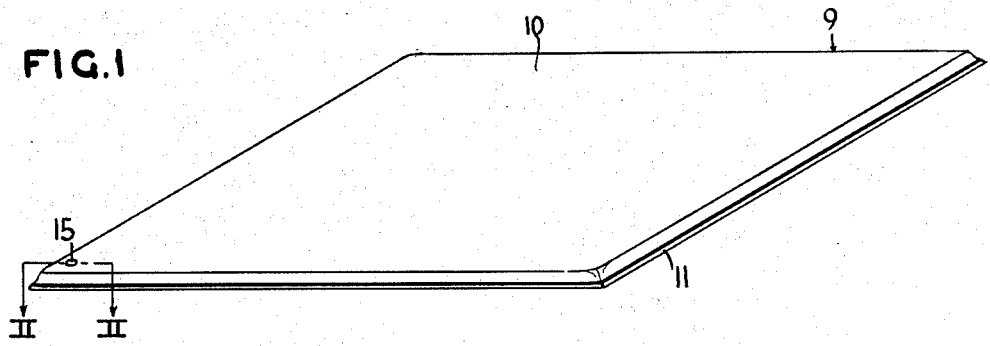
Fig. 1 is a diagrammatic view of a double glazed unit embodying the invention.
Figure 2:
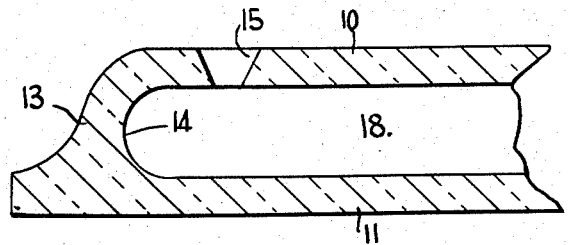
Fig. 2 is a view partially in section and partially in elevation taken along lines II—II of Fig. 1 illustrating a pore or vent hole in a multiple glazed unit.

A double glazed unit 9 embodying the principles of the invention comprises spaced sheets of glass 10 and 11 as shown in Figs. 1 and 2. The sheet 10 may have marginal edge portions 13 bent down and welded to the upper face of sheet 11 by the process and apparatus described in U.S. Patent No. 2,624,979. The welding may be substantially at the edge of the sheet 11 as shown in the drawing or it may be spaced a distance from the edge of sheet 11 in order to provide a flange which is one thickness of glass and may be puttied or otherwise secured in the opening which it is desired to close. The interior surface 14 of the welded edge is in the form of a rounded substantially semi-circular fillet.

The pore hole or vent is indicated generally by the numeral 15 and may be disposed in any convenient point in the unit, but as shown in the drawings, it is usually disposed near the edge of upper sheet 10 and preferably near a corner of said sheet. A single opening may be formed but other openings may be provided as necessary or desired. Dry gases, such as dehumidified air, can be blown into the opening 15 in order to quickly sweep out moist gases within the chamber 18 enclosed by the sheets 10 and 11.

The pore opening 15 is outwardly flared, for example, at an angle of approximately 10 to 30° at its outer face. It is usually desired that the pore opening be tapered at an angle above at least 5°, for use of pore openings having smaller tapers makes seating of the sleeve-like element much more difficult. Large degrees of taper are not desired because they require larger seal diameters. Combinations of various tapers may be employed if desired. For example, the outer portions of the opening may be tapered at a certain angle and the inner portion of the opening may be tapered at a lesser angle or cylindrically bored.

Figure 3:
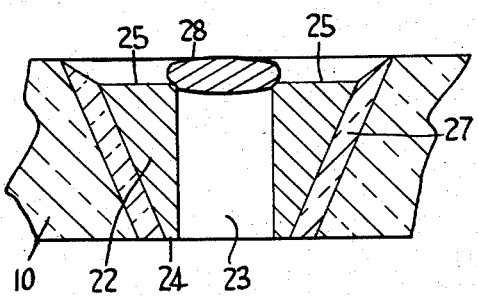
Fig. 3 is an enlarged sectional view of a fragment of a multiple glazed unit illustrating the pore closure structure of the present invention.

The closure structure is shown greatly enlarged in Fig. 3 of the drawing. The structure as shown includes an opening 15 formed near the edge portion of sheet 10

The opening is conically tapered with the diameter of the opening being largest at the outside of the unit. The closure structure for the opening includes a metal sleeve or eyelet element 22. The outside surface of the element 22 is of decreasing diameter from one end thereof to the other and may be evenly tapered to conform to the shape of the pore opening and thus be in the form of a frustum. The element 22 is provided with a cylindrical opening 23 in the center thereof. The axis of the cylinder coincides with the axis of the frustum-shaped element 22.

The frusto-conical peripheral shape of the element 22 and the cylindrical opening 23 therein provide a sleeve which is particularly adaptable for use in a pore closure structure employing solder. The thin walled sleeves of the prior art do not have enough heat capacity to prevent the heat of the soldering operation from passing rapidly into the glass-to-metal seal holding the eyelet in the opening. The present eyelet has relatively thin walls toward the inboard side 24 of the unit but the wall thickness increases to a maximum at the outer side 25 of the unit and eyelet where the solder is applied. The following dimensions are given by way of example. The opening 23 is 0.135 inch in diameter and the wall at 24 is 0.017 inch in thickness and 0.040 inch in thickness at 25.

The extra wall thickness at 25 provides a greater physical separation between the glass-to-metal seal and the solder seal. The thicker wall portion is more rigid and tends to minimize distortion that might occur to the element during cleaning to remove the oxide coating. Such distortion puts undue stresses on the glass-to-metal seal and may cause breakage thereof.

The external periphery of the element 22 is adhered to the edges of the pore opening by means of a low melting point fusion glass 27. The element 22 and fusion glass 27 should have a coefficient of thermal expansion closely matching the coefficient of expansion of the glass 10. When the multiple glazed unit is made and filled with dry air, the opening 23 in the pore closure structure of the present invention is closed with a suitable glass or metal solder 28.

The invention is further described in conjunction with a specific example of a multiple glazed unit and the present pore closure structure therefor. Conventional lime-soda-silica window or plate glass is employed, although it can be readily seen that sheet glass of other compositions can be used in a multiple glazed unit. The pore opening is formed in one of the sheets of glass which are to form the unit, preferably the upper sheet 10. This may be accomplished by suitable diamond-tipped drills or other glass abrading instruments. An evenly tapered opening narrowing in diameter from the outside surface of the unit to the inside surface is preferred, although other variations in shape such as described above may be utilized.

The periphery of the frustum shaped element 22 is coated with a low melting point glass frit. The softening point of the fusing glass is considerably lower, i.e., about 400 to 450° F. lower than the softening point of the glass sheets forming the unit. Care should be taken to see that none of the coating is formed on the base of the frustum shaped element, i.e., the surface facing the outside of the unit. This is the surface which is to receive the solder and it must be clean. Removal of glass from this surface sometimes results in breakage of the glass-to-metal seal.

The composition of the low fusion glass to be used will vary depending upon the melting point desired therein and also upon the coefficient of expansion of the glass to which it is to be bonded. The bonding glass 27 may contain high percentages of lead oxide, boric oxide and alumina. A glass which has been found highly useful for bonding a 4750 nickel-iron alloy to lime-soda-silica glass is made up of 68 percent by weight PbO, 14 percent by weight $B_2O_3$, 14 percent by weight $SiO_2$ and 4 percent by weight $Al_2O_3$. This glass has a softening point of about 931° F. A 4750 nickel-iron alloy contains approximately 47 percent by weight nickel, 50 percent by weight of iron plus small amounts of elements such as silicon, manganese and aluminum and has a coefficient of thermal expansion matching that of window and plate glass.

The bonding glass 27 for securing the element 22 in the opening 15 is preferably fused as a coating on the eyelet before the latter is inserted in the pore opening; however, it may be fused on the walls of the pore opening or both. Also, a separate liner of the bonding glass 27 may be made conforming to the shape of the pore opening and inserted therein prior to insertion of the element 22. This assembly is then heated to fuse the element to the pore opening.

A convenient mode of coating the exterior of the eyelet element 22 with the low melting glass involves the step of heat treating the element in air to provide a durable oxide coating on its outer surface. This treatment provides a better physical surface to which the low melting glass can adhere. A temperature of 1600° F. maintained for about 20 minutes is usually sufficient to accomplish this treatment. The element 22 is then heated to the temperature of the fusion point of the low melting glass and the glass is applied to the element. This application may be by spraying or otherwise coating the metal eyelet element with low melting glass.

One method of application which has been found acceptable is to mix 100 grams of a low fusion point glass which has been milled to a particle size which will permit approximately 90 percent or more to pass through a 325 mesh screen, with a carrier, for example 50 milliliters of methanol, and few cubic centimeters of Epsom salt solution. This mixture is put in a ball mill and milled. Small amounts of the milled mixture are then placed in an air brush and sprayed on the element while it is rotated on a pin. The mixture dries almost immediately and the coated eyelet element is then fired at a temperature of approximately 1400° F. to produce a glaze on the eyelet.

The coated element 22 is then inserted in the opening 15 and the assembly heated to a temperature sufficient to cause the fusion glass 27 to soften and adhere the element 22 to the walls of the pore opening. The heat for this operation may be provided during the welding operation, such as by the process described in U.S. Patent No. 2,686,342, or it may be done by localized heating of the glass surrounding the pore opening and the pore structure in the manner shown in U.S. Patent No. 2,683,906.

Preliminary to the soldering operation, the surface 25 of the element 22 which is to receive the solder is cleaned with an abrading tool to remove any oxide thereon or low melting glass accidently applied thereto. The cleaned area is tinned with solder, such as a solder containing equal amounts by weight of tin and lead. Suitable fluxes, such as an Allen stainless steel flux, are employed in the tinning operation. This flux consists essentially of 63 percent by weight of volatiles at 105° C. and 37 percent by weight of non-volatiles. The volatile portion comprises an aqueous solution of HCl containing 24 percent HCl by weight, and the non-volatile portion contains 90 percent by weight $ZnCl_2$, 5½ percent by weight $H_3BO_3$ and minor amounts of $H_2SO_4$, $CaCl_2$, $Fe_2O_3$, $MnCl_2$, $CuCl_2$, $NaCl$ and $MgCl_2$.

When the surface 25 is thus prepared for soldering, the unit 9 is first purged of moist air in its interior by blowing a dried gas into the chamber 18 through opening 23. This may be done through a small tube inserted in the opening 23. The moist gases escape through the space between the tube and the walls of the opening 23.

The solder is then applied to the surface 25 of the element 22 to close the opening 23. A tin-lead solder containing about 50 to 63 percent by weight of tin has been found to give the best closure. If the solder 28 contains more than 63 percent tin, poor bonding is noticed; whereas, if lower than 50 percent tin is present, high soldering temperatures are required which are likely to impair the glass-to-metal seal.

Although the present invention has been described with respect to specific details of certain embodiments thereof, it is not intended that such details be limitations upon the scope of the invention except insofar as set forth in the accompanying claims.

I claim:

1. A pore hole seal for a multiplied glazed unit having two spaced sheets of glass hermetically sealed at their edges to enclose a chamber comprising in combination a tapered pore opening in one of the sheets, which pore opening extends from and connects the chamber to the atmosphere, an elongated, thick-walled, metal element having a cylindrical opening therein and having an outer oxidized periphery which conforms to the shape of the wall of the pore opening, the wall of the element varying in thickness and being greatest in thickness at one end and smallest at the other, a low fusion point glass hermeticaly adhered to the oxidized periphery of the element and to the wall of the pore opening to hermetically seal the element in the opening with the thickness of the wall of the element at the end adjacent the atmosphere being sufficient to permit abrasive removal of an oxide coating on the interior wall surface of the element at that end of the element without damaging the glass seal between the element and the walls of the pore opening, and solder hermetically adhered to the inside, clean, metal surface of the element adjacent the end of the element nearest the atmosphere to act as the sole member to hermetically seal the opening in the element, said solder being confined to the clean, metal surface and thereby being out of contact with and spaced from the low fusion point glass by a portion of the wall thickness of the element.

2. A method of closing a tapered pore opening in a glass member of a multiple glazed unit, the pore opening extending from the interior of the unit to the atmosphere, which comprises providing for sealing in the opening an elongated, thick-walled, oxidized metal element having a cylindrical opening therein and having an outer oxidized periphery which conforms to the shape of the wall of the pore opening, the wall of the element varying in thickness from one end to the other, sealing the oxidized element to the walls of the pore opening with a low fusion point glass, said sealing being accomplished by heating the low fusion point glass to a temperature sufficient to soften it and cause adherence of it to the pore opening and to the oxidized element, the thickness of the wall of the element at the end adjacent the atmosphere being sufficient to permit abrasive removal of an oxide coating on the interior wall surface of the element at that end of the element without damaging the glass seal between the element and the wall of the pore opening, abrasively removing an oxide coating from the interior surface of the wall of the element adjacent the end nearest the atmosphere so as to form a clean, metal base for receiving solder and applying solder to the clean, metal portion of the element with the solder acting as the sole member to hermetically seal the opening of the element, said solder being confined to the clean, metal surface and thereby being out of contact with and spaced from the low fusion point glass by a portion of the wall thickness of the element.

References Cited in the file of this patent

UNITED STATES PATENTS

| | | |
|---|---|---|
| 2,683,906 | Nevins | July 20, 1954 |
| 2,686,342 | D'Eustachio | Aug. 17, 1954 |
| 2,749,579 | Shaw | June 12, 1956 |